United States Patent
Meyer et al.

(10) Patent No.: US 11,965,097 B2
(45) Date of Patent: Apr. 23, 2024

(54) WAX COMPOSITION COMPRISING LINEAR HYDROCARBONS, BRANCHED HYDROCARBONS AND OXIDIZED HYDROCARBONS, AQUEOUS DISPERSION THEREOF, METHOD TO PRODUCE SUCH WAX COMPOSITION AND DISPERSION AND USE THEREOF AS CARNAUBA WAX REPLACEMENT

(71) Applicant: Sasol Wax GmbH, Hamburg (DE)

(72) Inventors: Gernot Meyer, Rosengarten (DE); Ingo Behrmann, Barsbuttel (DE)

(73) Assignee: Sasol Germany GmbH, Hamburg (DE)

( * ) Notice: Subject to any disclaimer, the term of this patent is extended or adjusted under 35 U.S.C. 154(b) by 477 days.

(21) Appl. No.: 17/046,961

(22) PCT Filed: May 24, 2019

(86) PCT No.: PCT/EP2019/063549
§ 371 (c)(1),
(2) Date: Oct. 12, 2020

(87) PCT Pub. No.: WO2019/224389
PCT Pub. Date: Nov. 28, 2019

(65) Prior Publication Data
US 2021/0147686 A1    May 20, 2021

(30) Foreign Application Priority Data
May 25, 2018 (EP) ...................... 18174386

(51) Int. Cl.
*C08L 91/06* (2006.01)
*C08J 3/05* (2006.01)
(Continued)

(52) U.S. Cl.
CPC ................. *C08L 91/06* (2013.01); *C08J 3/05* (2013.01); *C08L 23/24* (2013.01); *C08L 23/30* (2013.01);
(Continued)

(58) Field of Classification Search
CPC .......... C08L 91/06; C08L 23/24; C08L 23/30; C08J 3/05; C08J 2323/24; C08J 2323/30;
(Continued)

(56) References Cited

U.S. PATENT DOCUMENTS 2,917,392 A    12/1959  Ligthelm et al.
4,265,663 A *  5/1981  Gilicinski ............... C08L 83/04
                                                             106/11
(Continued)

FOREIGN PATENT DOCUMENTS

JP    H6507443     8/1994
JP    2005234255   9/2005
(Continued)

OTHER PUBLICATIONS

Krendlinger, E., Wolfmeier, U., Schmidt, H., Heinrichs, F.- L., Michalczyk, G., Payer, W., Dietsche, W., Boehlke, K., Hohner, G. and Wildgruber, J. (2015). Waxes. In Ullmann's Encyclopedia of Industrial Chemistry, (Ed.). https://doi.org/10.1002/14356007.a28_103.pub2 (Year: 2015).*

(Continued)

*Primary Examiner* — Michael M Dollinger
*Assistant Examiner* — Christina H. W. Rosebach
(74) *Attorney, Agent, or Firm* — Werner IP Law, P.C.

(57) ABSTRACT

The invention relates to a wax composition comprising linear hydrocarbons, branched hydrocarbons and oxidized hydrocarbons, wherein the composition is characterized by a congealing point from 68° C. to 110° C., an acid number in the range of 3 to 30 mg KOH/g, a saponification number (Continued)

of 20 to 90 mg KOH/g and a needle penetration at 25° C. of below 15¹/₁₀ mm. The invention further relates to an aqueous dispersion comprising the wax composition and a method of manufacture of both the wax composition and the dispersion. The wax composition can be used to fully or partially substitute Carnauba wax or Candelilla wax.

20 Claims, 3 Drawing Sheets (51) Int. Cl.
*C08L 23/24* (2006.01)
*C08L 23/30* (2006.01)
(52) U.S. Cl.
CPC ........ *C08J 2323/24* (2013.01); *C08J 2323/30* (2013.01); *C08J 2391/06* (2013.01); *C08J 2423/24* (2013.01); *C08J 2423/30* (2013.01); *C08J 2491/06* (2013.01)
(58) Field of Classification Search
CPC . C08J 2391/06; C08J 2423/30; C08J 2491/06

See application file for complete search history.

(56) References Cited

U.S. PATENT DOCUMENTS

| | | | |
|---|---|---|---|
| 4,500,359 A | | 2/1985 | Woods et al. |
| 4,675,022 A | * | 6/1987 | Danner ................. D06M 13/02 8/918 |
| 5,783,618 A | * | 7/1998 | Danner ............... D06M 15/643 524/275 |
| 2010/0035493 A1 | * | 2/2010 | Oki ........................ D06M 15/53 442/100 |
| 2013/0305962 A1 | * | 11/2013 | Meyer ..................... C04B 24/00 524/277 |

FOREIGN PATENT DOCUMENTS

| | | |
|---|---|---|
| JP | 2018506491 | 3/2018 |
| WO | 2009112329 | 9/2009 |
| WO | 2013120792 | 8/2013 |
| WO | 2016096136 | 6/2016 |

OTHER PUBLICATIONS

"Carnauba Wax" by Strahl and Pitsch. Accessed at https://spwax.com/products/CarnaubaWax/sp-200 on Sep. 22, 2023. (Year: 2023).*
"SASOLWAX 6403", Product information, https://products.sasol.com/pic/products/home/grades/AS/5sasolwax-6403/index.html.

* cited by examiner

WAX COMPOSITION COMPRISING LINEAR HYDROCARBONS, BRANCHED HYDROCARBONS AND OXIDIZED HYDROCARBONS, AQUEOUS DISPERSION THEREOF, METHOD TO PRODUCE SUCH WAX COMPOSITION AND DISPERSION AND USE THEREOF AS CARNAUBA WAX REPLACEMENT

The invention relates to a wax composition comprising linear hydrocarbons, branched hydrocarbons and oxidized hydrocarbons, wherein the composition is characterized by a congealing point from 68° C. to 110° C., an acid number in the range of 3 to 30 mg KOH/g, a saponification number of 20 to 90 mg KOH/g and a needle penetration at 25° C. of below 15¹/₁₀ mm. The invention further relates to an aqueous dispersion comprising the wax composition and a method of manufacture of both the wax composition and the dispersion. The wax composition can be used to fully or partially substitute Carnauba wax or Candelilla wax.

BACKGROUND OF THE INVENTION

Wax composition with distinct properties like a specific congealing point, acid number, saponification number and needle penetration can be used for different applications such as coating for fruits, papers, tablets, candies or sweets, hardening or thickening agent in cosmetics, ingredients in deodorants, polishing agents, water-proofing of leather products, candles, finishing of wood or mold release agents.

Furthermore, these wax compositions often used in the toner and ink industry because of its unique technical profile combining gloss, hardness, relatively sharp melting point, rub/slip properties and good compatibility with polyester resins.

Natural waxes (e. g. Carnauba wax) with such properties have a relatively high price due to its limited availability. Furthermore, they are complex compositions comprising aliphatic esters and acids, alcohols, aromatic acids, paraffins, diols, saponifiable and unsaponifiable components and resins.

Waxes in general are mostly defined as chemical compositions, which have a drop melting point above 40° C., are polishable under slight pressure, are knead-able or hard to brittle and transparent to opaque at 20° C., melt above 40° C. without decomposition, and typically melt between 50 and 90° C. with exceptional cases up to 200° C., form pastes or gels and are poor conductors of heat and electricity.

Waxes can be classified according to various criteria such as e.g. their origin. Here, waxes can be divided into two main groups: natural and synthetic waxes. Natural waxes can further be divided into fossil waxes (e.g. petroleum waxes) and non-fossil waxes (e.g. animal and vegetable waxes such as Carnauba wax). Petroleum waxes are divided into macrocrystalline waxes (paraffin waxes) and microcrystalline line waxes (microwaxes). Synthetic waxes can be divided into partially synthetic waxes (e.g. amide waxes) and fully synthetic waxes (e.g. polyolefin- and Fischer-Tropsch waxes).

Paraffin waxes are originating from petroleum sources. They are clear, odor free and can be refined for food contact. They contain a range of n-alkanes and branched alkanes as well as some cyclo-alkanes. Raw or crude paraffin waxes (slack waxes) have a great number of short-chained alkanes ("oils"), which are removed when further refined. Different distributions and qualities of paraffin waxes can be obtained. Refining may include deoiling, distillation and hydrogenation.

Synthetic Fischer-Tropsch waxes or hydrocarbons originating from the catalyzed Fischer-Tropsch synthesis of syngas (CO and $H_2$) to alkanes contain predominantly n-alkanes, a low number of branched alkanes and basically no cyclo-alkanes or impurities like e.g. sulfur or nitrogen. In return the number of olefins and oxygenates (i.e. oxidized hydrocarbons such as alcohols, esters, ketones and/or aldehydes) may be higher and different to petroleum based waxes. Fischer-Tropsch waxes can generally be classified in low melting (congealing point of 20 to 45° C.), medium melting (congealing point of 45° C. to 70° C.) and high-melting (congealing point of 70 to 105° C.).

Another source for synthetic waxes/hydrocarbons are products obtained from the oligomerization/polymerization of olefinic monomers, possibly followed by hydrogenation. Such polyolefins can have a high degree of branching and/or high molecular weight $M_n$ above 4.000 g·mol$^{-1}$. They may also show wax-like characteristics and are therefore well suited to be blended with other (hydrocarbon) waxes to adjust the properties thereof.

Additionally, all hydrocarbon waxes can be oxidized by different methods, the easiest one being the process of reacting waxes with oxygen or air, preferably in presence of a catalyst. The oxidation introduces different functionalities (hydroxyl-, carbonyl-, carboxyl-groups etc.) and is generally carried out without changing the alkyl-branching or total carbon number of the molecules. A typical ratio of functionalities formed during oxidation is 1.5 parts ketones to 1 part acids to 1 part esters to 1 part hydroxyls. Formed internal esters (e.g. lactones) can be opened by saponification with metal soaps, which also saponifies the other carboxyl sites in the oxidized wax molecule. The degree of oxidation reflected for example by the acid number of the oxidized wax can be adjusted by the oxidation procedure. Therefore, the content of oxidized hydrocarbons can be adjusted.

In general polyolefin waxes (see above) have higher molecular weights than paraffin or Fischer-Tropsch waxes resulting in higher viscosities and a different chemical structure. Due to different monomer building blocks (ethylene, propylene, alpha-olefin or mixtures thereof) and the production of polyolefin waxes they have a larger number of molecules with two carbon atoms difference per molecule depending on the used building block(s), for example. The same is true for most of the oxidized derivatives thereof. Polyolefin waxes also have a different pattern of branches, up to very long branches in the side chains.

The use of oxidized and/or saponified Fischer-Tropsch waxes in wax powders for impregnating gypsum is known from WO 2016096136.

U.S. Pat. No. 2,255,242 discloses an "artificial Carnauba wax" consisting essentially of a fat having a melting point higher than 20° C. and coumarone-indene resin having a melting point higher than 100° C. and being completely soluble in mineral spirits at normal room temperature, the fat and the coumarone-indene resin being included within the approximate reciprocal ratio of 2:3 parts of one with 3:2 parts of the other.

GB 844382 discloses oxidized FT-waxes (e.g. Duroxon H-110: MP=90-95° C., Acid=15-30, Sap=60-75, Pen=2-4) for heat transfer inks.

GB 973291 discloses carbon transfer inks with Carnauba wax substitutes consisting of waxes of the general formula ROOC—$C_nH_m$—COOR$^1$, in which n is an integer from 2 to 8, m is an integer of 2n, and when n is 2, m may also be n; R is an alkyl group derived from a straight chain aliphatic alcohol having from 16 to 22 carbon atoms, and $R^1$ is either R or hydrogen. Examples for that are di-docosyl succinate, di-docosyl sebacate, mono-docosyl maleate, mono-docosyl succinate or di-docosyl pimelate.

U.S. Pat. No. 4,293,345 discloses more complex wax compositions for replacing Carnauba or Montan wax consisting of (a) esters of phenols or aromatic, aliphatic or cycloaliphatic alcohols having at least 1 to 10 primary or secondary hydroxyl groups; (b) amides of ammonia or aliphatic, cycloaliphatic or aromatic amines having at least 1 to 15 primary or secondary amino groups; (c) salts of alkali metals or alkaline earth metals, amphoteric metals, heavy metals, of ammonium or of a compound containing a tertiary amino group.

US 20110223527 discloses the use of FT-wax, oxidized wax or paraffin with polyethylene wax as replacement for Carnauba wax in toners.

U.S. Pat. No. 2,917,392 describes the hardening of oxidized FT-waxes by saponification to obtain waxes similar to Carnauba wax.

And finally, GB 860688 discloses specific oxidized FT-waxes as replacement for Carnauba wax. In the introductory part it is also mentioned that polyethylene may be blended to increase hardness and toughness of oxidized waxes with a low hardness for replacing Carnauba, but then emulsion forming properties usually suffer.

Therefore, it still exists a need for an improved wax composition, which not only matches the chemical properties but also has similar physical properties and provides the same benefits as Carnauba wax does in the different applications.

DESCRIPTION OF THE INVENTION

The object of the invention can surprisingly be achieved with a wax blend comprising
  linear and branched wax hydrocarbons having 15 to 110 carbon atoms; and
  oxidized hydrocarbons,
  that is characterized by
  a congealing point from 68° C. to 110° C.,
  an acid number of 3 to 30 mg KOH/g,
  a saponification number of 20 to 90 mg KOH/g, and
  a needle penetration at 25° C. of below 15 1/10 mm.

The wax hydrocarbons form the base of the composition providing the required wax properties, whereas the oxidized hydrocarbons provide the functionality and the required acid and saponification number.

Hydrocarbons according to the invention are molecules consisting exclusively of carbon and hydrogen, such as alkanes. Wax hydrocarbons as the term is used herein are hydrocarbons having 15 to 110 carbon atoms. Oxidized hydrocarbons are hydrocarbon molecules comprising at least one oxygen moiety selected from the group consisting of hydroxyl, carbonyl, carboxylate or lactone. Molecules in which the carbon chain is linear include oxidized hydrocarbons that are without branched and cyclic structures.

The wax hydrocarbons may be synthetic hydrocarbons and the oxidized hydrocarbons may originate from synthetic hydrocarbons, both preferably obtained by the Fischer-Tropsch synthesis, which according to the invention are defined as hydrocarbons originating from the Cobalt- or Iron-catalyzed Fischer-Tropsch synthesis of syngas (CO and $H_2$) to alkanes. The crude product of this synthesis is separated into liquid and different solid fractions by distillation. The hydrocarbons contain predominantly n-alkanes, a low number of branched alkanes and basically no cycloalkanes or impurities like e.g. sulfur or nitrogen.

Fischer-Tropsch waxes consist of methylene units and their carbon chain length distribution is according to one embodiment characterized by an evenly increasing and decreasing number of molecules for the particular carbon atom chain lengths involved. This can be seen in GC-analyses of the wax.

The branched molecules of the Fischer-Tropsch wax preferably contain more than 10 wt.-%, more preferably more than 25 wt.-% molecules with methyl branches.

Furthermore, the branched molecules of the Fischer-Tropsch wax preferably contain no quaternary carbon atoms. This can be seen in NMR-measurements of the wax.

The terms "Fischer-Tropsch waxes" or "waxes obtained from the Fischer-Tropsch synthesis" are used herein synonymously/interchangeable.

The oxidized hydrocarbons from the Fischer-Tropsch synthesis may be produced by the subsequent reaction of the wax hydrocarbons with air at elevated temperatures with or without the use of a catalyst until the desired acid and saponification number are obtained.

In an especially preferred embodiment the wax composition further comprises a polyolefin wax. The polyolefin wax further improves the required hardness of the wax composition, which is defined by the needle penetration at 25° C., which preferably is equal to or below 10 1/10 mm, more preferably equal to or below 8 1/10 mm.

The wax composition may comprise the polyolefin wax in an amount of 0.1 to 5 wt.-%, preferably 0.5 to 2 wt.-%.

The polyolefin wax preferably is a polyalpha-olefin wax, more preferably a hyperbranched polyalpha-olefin wax, most preferably a hyperbranched polyolefin wax having a softening point of between 70° and 80° C. and a molecular weight $M_n$ determined by gel permeation chromatography of above 4000 g·mol$^{-1}$. The polyalpha-olefin wax preferably originates from the polymerization of alpha-olefins having at least 14 carbon atoms, preferably having between 14 and 30 carbon atoms. Hyperbranched polyalpha-olefin waxes comprise additional branching in at least some of the sidechains, which means that the alpha-olefins polymerized are branched alpha-olefins or mixtures of branched and linear alpha-olefins.

In further preferred embodiments the wax compositions additionally have independent of each other one or more of the following properties:
  a congealing point between 76° and 110° C., preferably between 76° and 90° C., more preferably between 76° and 85° C.,
  an acid number of between 3 and 20 mg KOH/g or 6 and 20 mg KOH/g, preferably between 3 and 15 mg KOH/g or 6 and 15 mg KOH/g, more preferably between 10 and 15 mg KOH/g, a saponification number of between 25 and 80 mg KOH/g, preferably between 25 and 35 mg KOH/g, a drop melting point of between 80 and 88° C., preferably between 84 and 88° C., a DSC melt peak at 82 to 84° C., a color of below 1, preferably equal to or below 0.5, and a clear and transparent liquid melt phase.

According to a further preferred embodiment the molar mass (number average) of the wax hydrocarbons and/or the oxidized hydrocarbons is between 300 to 1500 g·mol$^{-1}$, preferably between 400 to 1300 g·mol$^{-1}$ and more preferably between 500 to 800 g·mol$^{-1}$.

The content of molecules of the wax hydrocarbons and/or the oxidized hydrocarbons in which the carbon chain is linear may be above 75 wt.-%, preferably above 80 wt.-%

The branched molecules of the wax hydrocarbons and/or oxidized hydrocarbons preferably contain more than 10 wt.-%, more preferably more than 25 wt.-% molecules, with methyl branches and optionally the molecules comprise no quaternary carbon atoms.

In preferred embodiment the oxidized hydrocarbons are fully or partially saponified. Saponification can be conducted by adding metal soaps to the oxidized hydrocarbons, which opens the internal esters (e.g. lactones) and/or saponifies the carboxyl sites in the oxidized molecules, which increases the saponification number.

The wax composition preferably consists to more than 50 wt.-%, more preferably to more than 90 wt.-%, exclusively of the above defined polyolefin wax, wax hydrocarbons and oxidized hydrocarbons.

The wax composition may also be mixed with Carnauba wax to replace the Carnauba only partially. Therefore, the invention also covers an embodiment in which the wax composition comprises up to 75 wt.-%, preferably up to 90 wt.-% Carnauba wax. According to a further embodiment the wax composition may be a partially substituted Carnauba wax composition comprising the wax composition as defined herein and Carnauba wax in a weight ratio of 1:9 to 9:1, preferably 1:3 to 3:1.

According to a further embodiment of the invention the wax composition is part of an aqueous dispersion comprising the wax composition as described above, water and optionally a surfactant.

The oxidized hydrocarbons within the wax composition allow emulsification without (external) emulsifier by adding strong bases like e.g. potassium hydroxide.

The surfactant may be a non-ionic emulsifier e.g. an ethoxylated alcohol or a combination of such a non-ionic emulsifier with anionic emulsifiers e.g. saponified fatty acids.

The solid content of the dispersion may be above 20 wt.-%, the Brookfield viscosity at 25° C. below 500 mPa·s and the average particle size (number average) $d_{50}$ measured by laser diffraction below 1 µm, preferably below 0.5 µm.

Such dispersions may be used for impregnating wood particle boards, green boards or other construction materials.

A further aspect of the invention is a method of preparing a wax composition as described above comprising at least the following steps:

providing as components wax hydrocarbons, oxidized hydrocarbons and optionally a polyolefin wax, mixing the components in a molten state with each other to obtain the wax composition, and solidifying the wax composition, preferably by spray cooling or pastillation or slabbing.

In a preferred embodiment the process further comprises a subsequent milling of the wax composition in a jet mill after the solidification.

Another embodiment of the invention is a method of producing an aqueous wax dispersion comprising at least the following steps:

providing the wax composition according to the invention in a molten state, adding water and surfactant to the molten wax composition, emulsifying the components together in a high pressure homogenizer, an autoclave or with a ultrasonic sonotrode.

Yet a further embodiment of the present invention is the use of the wax compositions to fully or partial replace Carnauba wax or Candelilla wax in existing formulations requiring the use of Carnauba wax or Candelilla wax.

All congealing points mentioned herein have been measured according to ASTM D 938, all acid numbers according to ASTM D 1386, all saponification number according to ASTM D 1387, all needle penetrations either at 25° C. or at 40° C. according to ASTM D 1321, all softening points according to ASTM D 36, all drop melting points according to ASTM D 127 and the color according to ASTM D 1500.

The wax composition or the partially substituted Carnauba wax composition of the present invention may be used as part of a polish, personal care or toner, preferably a shoe polish, a car polish, a plastic polish, a metal polish or a food coating or a lip care or a chemical toner. The above polish, personal care or toner composition preferably comprises 1 to 50 wt.-% of the wax composition or partially substituted Carnauba wax composition, more preferably 2 to 30 wt.-%, most preferably 3 to 15 wt.-% or 5 to 12 wt.-%.

Typical exemplary recipes in which Carnauba wax and/or the wax compositions according to the invention can be used are listed below:

Furniture wax:
  113 g Carnauba wax (flakes or granules)
  453 g Beeswax (flakes or granules)
  0.946 l Turpentine Wood wax:
  25 g Carnauba wax
  25 g Candelilla wax
  100 g bleached Beeswax or Microcrystalline wax
  25 ml double boiled Linseed oil
  700 ml odorless thinner
  75 ml Citrus solvent Car polish:
  25 ml Coconut Oil
  20 g Carnauba Wax
  10 g Beeswax
  37.5 ml White Vinegar
  3 ml of essential oils (e.g. 1.5 ml Scotch Pine+1.5 ml of Fir Needle)

Wax polish:
  10 g Carnauba wax
  89 g Beeswax
  1 g Colophony
  150 g Balsam turpentine oil T Wipe care product for the simultaneous care and cleaning of non-porous vehicle surfaces:
  0.2 wt.-% crosslinked polyacrylic acid polymer (Carbopol EZ-31 from Lubrizol)
  0.95 wt.-% silicone mixture (90 wt.-% Dow Corning 200 Fluid and 10 wt.-% Dow Corning 2-1912 Fluid)
  1.98 wt.-% Carnauba wax emulsion (22% solid content)

96.08 wt.-% Deionized water
0.04 wt.-% Titanium dioxide
0.1 wt.-% preservative (Dimethylol-5,5-dimethyl-hydantoine, Dantoguard Plus from Lonza)
0.25 wt.-% Triethanolamine (99%)
0.4 wt.-% low molecular silicone ether Fostering polish without solvent:
  3 wt.-% Phosphated alcohol ethoxylate (polyfunctional surfactant, TENSAN P894P from Neochem)
  2 wt.-% non-ionic surfactant (POLYGON PC 1711 from Neochem)
  2 wt.-% dispersing agent (POLYGON PC 1395 from Neochem)
  0.1 wt.-% Methyl-(chlor-)isothiazolinone
  0.1 wt.-% fragrance
  77.5 wt.-% water
  15 wt.-% Carnauba wax emulsion
  0.3 wt.-% non-ionic thickener (POLYGON PC 2020 from Neochem)

Lip care:
  7 g Beeswax (white, bleached)
  37.5 ml almond oil, refined
  2.5 g Carnauba wax
  0.1 g pearlescent pigment
  1.5 ml Fluidlecithin CM Shoe polish:
  7.9 wt.-% Carnauba wax
  7.9 wt.-% partly saponified ester wax (Licowax O from Clariant)
  1.0 wt.-% Ester of montanic acids with multifunctional alcohols (Licowax E from Clariant)
  2.0 wt.-% non-polar polyethylene wax (Licowax PE 520 from Clariant)
  1.2 wt.-% Ozocerite wax (Ozokerit 2089)
  14.8 wt.-% Paraffin wax (Sasolwax 5603)
  73.1 wt.-% Petroleum sprit Toner Compositions:
a) 90 wt.-% styrene-acrylic resin (CPR100 from Mitsui)
  4 wt.-% carbon black
  1 wt.-% charge controlling agent (Copy charge N4S from Clariant)
  4 wt.-% Carnauba wax
  1 wt.-% flowing agent (silica-based, HDK from Wacker)
  5 g thereof mixed with 95 g iron powder
b) 17.2 wt.-% polyester resin
  69 wt.-% styrene-acrylic resin
  3.9 wt.-% Carnauba wax
  8.6 wt.-% carbon black
  0.9 wt.-% zirconium compound
  0.4 wt.-% hydrophilic silica
c) 28.2 wt.-% styrenic resin
  5.6 wt.-% cyclized rubber
  1.1 wt.-% charge controlling agent
  1.2 wt.-% carbon black
  28.2 wt.-% paraffin wax
  28.2 wt.-% Carnauba wax
  10 g thereof mixed with 0.1 g zinc stearate powder, 0.1 g hydrophobic silica and 90 g magnetite and epoxy resin

EXAMPLES

Table 1 shows the physical data of a Carnauba wax T3-grade compared to an oxidized Fischer-Tropsch wax (Sasolwax NCM 9381, available from Sasol Wax GmbH) and an oxidized polyethylene wax (AC6702 from Honeywell). As one can see some of the properties such as acid number and dropping point already show a good fit, but especially the hardness (penetration) does not fulfill the requirements of a suitable Carnauba wax replacement.

TABLE 1

Comparison of Carnauba wax with existing products.

| Method | Unit | Carnauba-wax T3 (comp.) | Sasolwax NCM 9381 (comp.) | AC 6702 PEox from Honeywell |
|---|---|---|---|---|
| Drop melting point ASTM D 127 | ° C. | ~84 | 86.5 | 88 |
| Congealing point ASTM D 938 | ° C. | 76-82 | 78 | — |
| Color ASTM D 1500 | — | yellow | 0.9 | Light yellow |
| Acid number ASTM D 1386 | mg KOH/g | 5-15 | 27 | 14 |
| Saponification number ASTM D 1387 | mg KOH/g | 80-90 | 58 | — |
| Needle Penetration @25° C. ASTM D 1321 | 0.1 mm | 0-1 | 16 | 90 |
| Needle Penetration @40° C. ASTM D 1321 | 0.1 mm | 1 | 41 | — |
| DSC Melt peak | ° C. | 83.6 | 76.6 | — |

Figure 1:
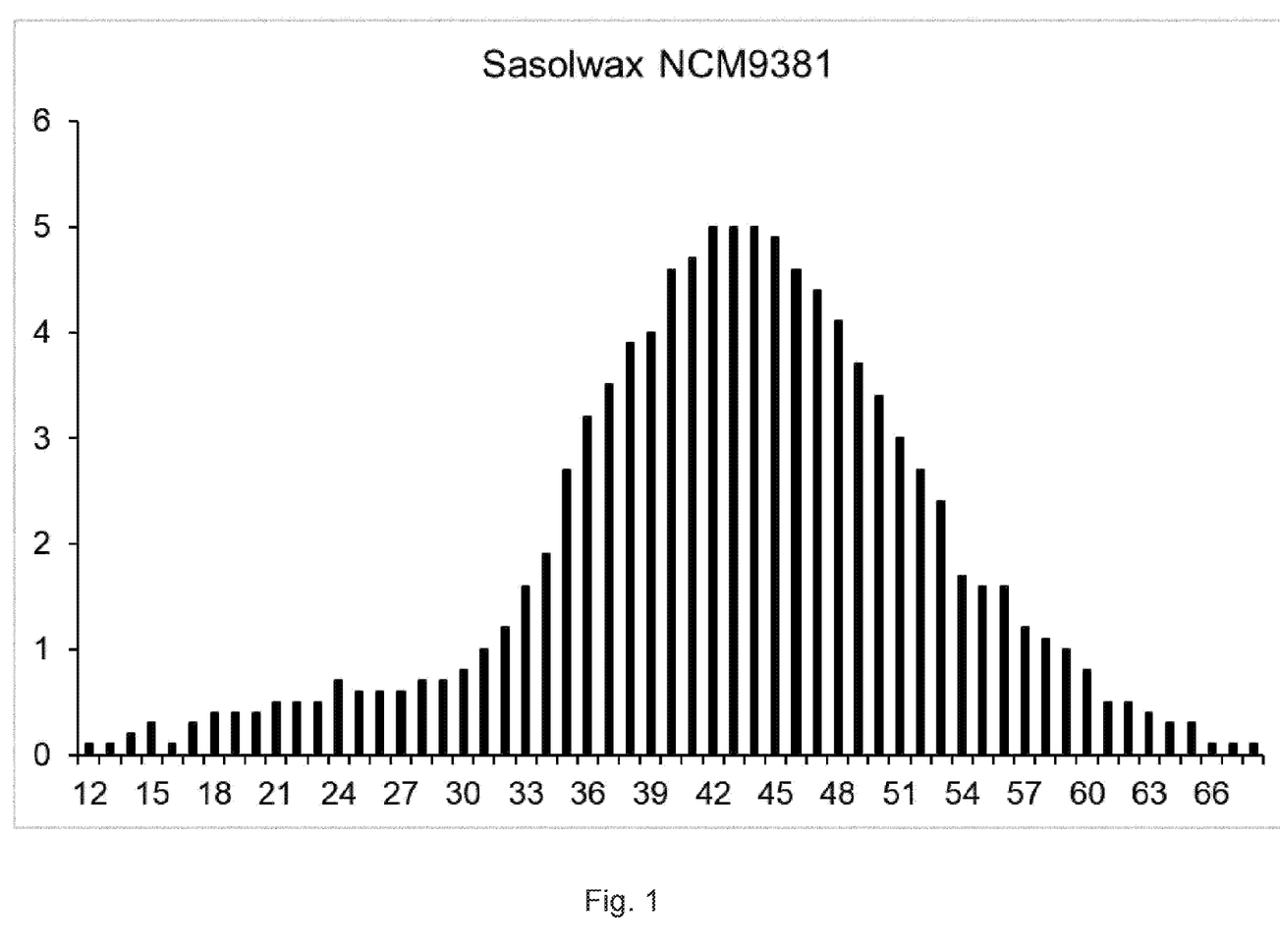
FIG. 1 depicts the carbon number distribution for a first wax hydrocarbon, displaying the wt.% against carbon number.
Figure 2:
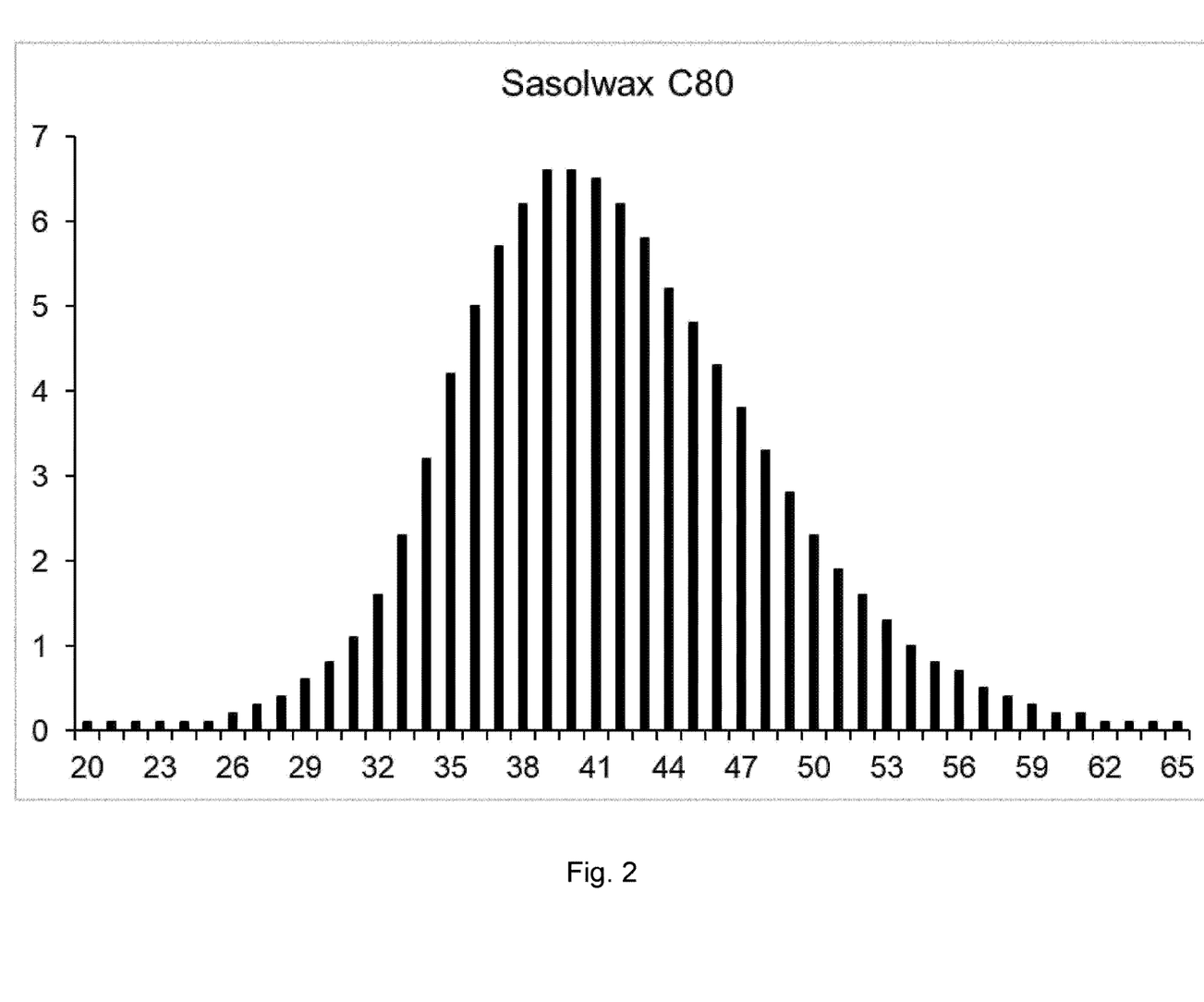
FIG. 2 depicts the carbon number distribution for a second wax hydrocarbon, displaying the wt.% against carbon number.
Figure 3:
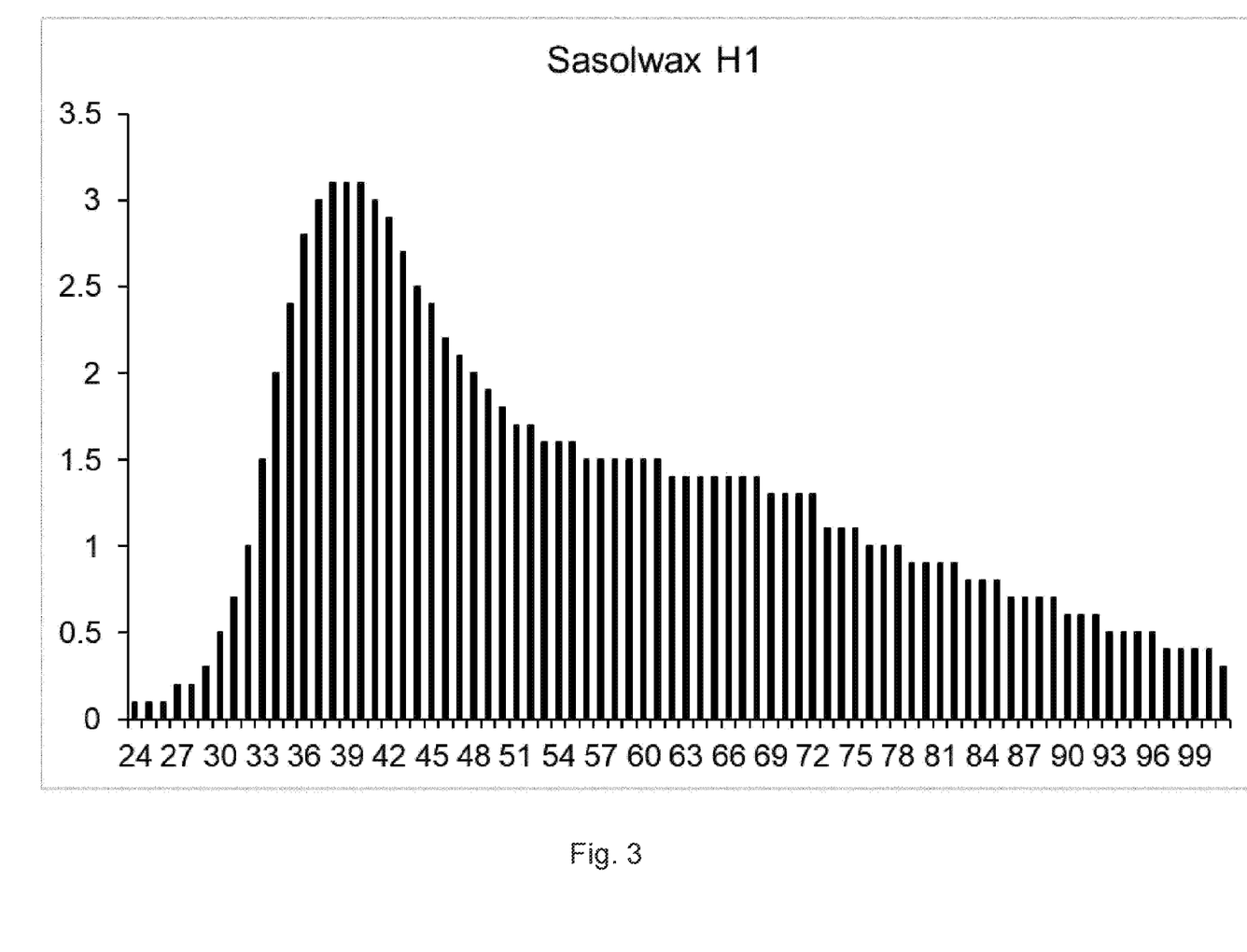
FIG. 3 depicts the carbon number distribution for a third wax hydrocarbon, displaying the wt.% against carbon number.

Table 2 shows the formulation of wax compositions comprising commercially available wax hydrocarbons and oxidized hydrocarbons with distinct properties according to the invention and with typical carbon number distributions (see table 3 and FIG. 1-3, displayed in in wt. % against carbon number, the carbon number was determined by gas chromatography according to EWF-method 001/03 of the European Wax Federation) as well as mixtures thereof with polyolefin waxes, which were produced by melt-blending the individual components together and solidifying them afterwards.

TABLE 2

Formulation of different wax compositions (blends).

| Components | Blend 1 | Blend 2 | Blend 3 | Blend 4 |
|---|---|---|---|---|
| Sasolwax C80* | 50 wt.-% | 49 wt.-% | | 45 wt.-% |
| Sasolwax H1* | | | 5 wt.-% | 5 wt.-% |
| Sasolwax NCM 9381* | 50 wt.-% | 50 wt.-% | 95 wt.-% | 50 wt.-% |
| Polyboost 165 | | 1 wt.-% | | |

*all available from Sasol Wax GmbH

TABLE 3

Carbon number distribution of commercially available waxes Sasolwax C80, H1 and NCM9381 determined by gas chromatography according to EWF-method 001/03 of the European Wax Federation.

| NCM 9381 | |
|---|---|
| Carbon no. | Wt. -% |
| 12 | 0.1 |
| 13 | 0.1 |
| 14 | 0.2 |

TABLE 3-continued

Carbon number distribution of commercially available waxes Sasolwax C80, H1 and NCM9381 determined by gas chromatography according to EWF-method 001/03 of the European Wax Federation.

| | |
|---|---|
| 15 | 0.3 |
| 16 | 0.1 |
| 17 | 0.3 |
| 18 | 0.4 |
| 19 | 0.4 |
| 20 | 0.4 |
| 21 | 0.5 |
| 22 | 0.5 |
| 23 | 0.5 |
| 24 | 0.7 |
| 25 | 0.6 |
| 26 | 0.6 |
| 27 | 0.6 |
| 28 | 0.7 |
| 29 | 0.7 |
| 30 | 0.8 |
| 31 | 1 |
| 32 | 1.2 |
| 33 | 1.6 |
| 34 | 1.9 |
| 35 | 2.7 |
| 36 | 3.2 |
| 37 | 3.5 |
| 38 | 3.9 |
| 39 | 4 |
| 40 | 4.6 |
| 41 | 4.7 |
| 42 | 5 |
| 43 | 5 |
| 44 | 5 |
| 45 | 4.9 |
| 46 | 4.6 |
| 47 | 4.4 |
| 48 | 4.1 |
| 49 | 3.7 |
| 50 | 3.4 |
| 51 | 3 |
| 52 | 2.7 |
| 53 | 2.4 |
| 54 | 1.7 |
| 55 | 1.6 |
| 56 | 1.6 |
| 57 | 1.2 |
| 58 | 1.1 |
| 59 | 1 |
| 60 | 0.8 |
| 61 | 0.5 |
| 62 | 0.5 |
| 63 | 0.4 |
| 64 | 0.3 |
| 65 | 0.3 |
| 66 | 0.1 |
| 67 | 0.1 |
| 68 | 0.1 |

C80

| Carbon no. | Wt. -% |
|---|---|
| 20 | 0.1 |
| 21 | 0.1 |
| 22 | 0.1 |
| 23 | 0.1 |
| 24 | 0.1 |
| 25 | 0.1 |
| 26 | 0.2 |
| 27 | 0.3 |
| 28 | 0.4 |
| 29 | 0.6 |
| 30 | 0.8 |
| 31 | 1.1 |
| 32 | 1.6 |
| 33 | 2.3 |
| 34 | 3.2 |
| 35 | 4.2 |
| 36 | 5 |
| 37 | 5.7 |
| 38 | 6.2 |
| 39 | 6.6 |
| 40 | 6.6 |
| 41 | 6.5 |
| 42 | 6.2 |
| 43 | 5.8 |
| 44 | 5.2 |
| 45 | 4.8 |
| 46 | 4.3 |
| 47 | 3.8 |
| 48 | 3.3 |
| 49 | 2.8 |
| 50 | 2.3 |
| 51 | 1.9 |
| 52 | 1.6 |
| 53 | 1.3 |
| 54 | 1 |
| 55 | 0.8 |
| 56 | 0.7 |
| 57 | 0.5 |
| 58 | 0.4 |
| 59 | 0.3 |
| 60 | 0.2 |
| 61 | 0.2 |
| 62 | 0.1 |
| 63 | 0.1 |
| 64 | 0.1 |
| 65 | 0.1 |

H1

| Carbon no. | Wt. -% |
|---|---|
| 24 | 0.1 |
| 25 | 0.1 |
| 26 | 0.1 |
| 27 | 0.2 |
| 28 | 0.2 |
| 29 | 0.3 |
| 30 | 0.5 |
| 31 | 0.7 |
| 32 | 1 |
| 33 | 1.5 |
| 34 | 2 |
| 35 | 2.4 |
| 36 | 2.8 |
| 37 | 3 |
| 38 | 3.1 |
| 39 | 3.1 |
| 40 | 3.1 |
| 41 | 3 |
| 42 | 2.9 |
| 43 | 2.7 |
| 44 | 2.5 |
| 45 | 2.4 |
| 46 | 2.2 |
| 47 | 2.1 |
| 48 | 2 |
| 49 | 1.9 |
| 50 | 1.8 |
| 51 | 1.7 |
| 52 | 1.7 |
| 53 | 1.6 |
| 54 | 1.6 |
| 55 | 1.6 |
| 56 | 1.5 |
| 57 | 1.5 |
| 58 | 1.5 |
| 59 | 1.5 |
| 60 | 1.5 |
| 61 | 1.5 |

TABLE 3-continued

Carbon number distribution of commercially available waxes Sasolwax C80, H1 and NCM9381 determined by gas chromatography according to EWF-method 001/03 of the European Wax Federation.

| | |
|---|---|
| 62 | 1.4 |
| 63 | 1.4 |
| 64 | 1.4 |
| 65 | 1.4 |
| 66 | 1.4 |
| 67 | 1.4 |
| 68 | 1.4 |
| 69 | 1.3 |
| 70 | 1.3 |
| 71 | 1.3 |
| 72 | 1.3 |
| 73 | 1.1 |
| 74 | 1.1 |
| 75 | 1.1 |
| 76 | 1 |
| 77 | 1 |
| 78 | 1 |
| 79 | 0.9 |
| 80 | 0.9 |
| 81 | 0.9 |
| 82 | 0.9 |
| 83 | 0.8 |
| 84 | 0.8 |
| 85 | 0.8 |
| 86 | 0.7 |
| 87 | 0.7 |
| 88 | 0.7 |
| 89 | 0.6 |
| 90 | 0.6 |
| 91 | 0.6 |
| 92 | 0.5 |
| 93 | 0.5 |
| 94 | 0.5 |
| 95 | 0.5 |
| 96 | 0.5 |
| 97 | 0.4 |
| 98 | 0.4 |
| 91 | 0.4 |
| 100 | 0.4 |
| 101 | 0.3 |

Polyboost 165 is a hyperbranched (high amount of branching and high length of the branches) polyalpha-olefin wax from the company Limdon Specialty with a softening point according to ASTM D 36 of 74° C., a needle penetration at 25° C. of 5¹/₁₀ mm, a molecular weight $M_n$ and a polydispersity $M_w/M_n$, both determined by gel permeation chromatography, of $M_n$=4400 g marl and $M_w/M_n$=8.

TABLE 4

Physical data of different wax compositions.

| | | Sasolwax NCM 9383 (comp.) | Blend 1 (inv.) | Blend 2 (inv.) | Blend 3 (inv.) | Blend 4 (inv.) |
|---|---|---|---|---|---|---|
| Drop melting point ASTM D 127 | ° C. | 109 | 86.3 | 86.3 | 96.3 | 97.1 |
| Congealing point ASTM D 938 | ° C. | — | 82.5 | 82.5 | 81.5 | 82.0 |
| Color ASTM D 1500 | | 1.5 | 0.5 | 0.5 | 0.5 | <0.5 |
| Acid number ASTM D 1386 | mg KOH/g | 14 | 13.5 | 13.5 | 25.7 | 13.5 |
| Saponification number ASTM D 1387 | mg KOH/g | 37 | 29.0 | 29.0 | 55.0 | 29.0 |
| Needle Penetration @ 25° C. ASTM D 1321 | 0.1 mm | 12 | 10 | 8 | 12 | 8 |
| Needle Penetration @ 40° C. ASTM D 1321 | 0.1 mm | 27 | 26 | 23 | 32 | 24 |
| DSC Melt peak | ° C. | — | 82.7 | 82.5 | 82.4 | 83.0 |

The wax compositions according to the invention, especially inventive blend 2, showed a much better fit to Carnauba wax with regard to the hardness and melt behavior (e.g. DSC melt peak, see table 4). Furthermore, the color was much lighter than pure Carnauba wax and the liquid melt phase is clear and transparent compared to a non-soluble turbid appearance, which both may have advantages in certain applications, such as coatings. A saponified oxidized Fischer-Tropsch wax (Sasolwax NCM 9383) showed a too high drop melting point, but may be used as further blend component to modify the saponification number.

Inventive blend 2 shows a very good coating behavior on PET films.

In table 5 the physical data of mixtures of Carnauba wax with the wax composition of blend 2 can be seen. The Carnauba wax T3 can therefore be fully or partially replaced by the inventive blend 2.

TABLE 5

Physical data of different mixtures of Carnauba wax and blend 2.

| | | Carnaubawax T3 | 25% Blend 2 | 50% Blend 2 | 75% Blend 2 | 100% Blend 2 |
|---|---|---|---|---|---|---|
| Drop melting point ASTM D 127 | ° C. | 85.7 | 83.8 | 83 | 84 | 86.3 |
| Congealing point ASTM D 938 | ° C. | 77.5 | 76.5 | 78.5 | 80.5 | 82.5 |
| Color ASTM D 1500 | | yellow | 7.2 | 6.4 | 4.2 | 0.5 |
| Acid number ASTM D 1386 | mg KOH/g | 6 | 7.9 | 9.75 | 11.6 | 13.5 |
| Saponification number ASTM D 1387 | mg KOH/g | 89 | 74 | 59 | 44 | 29.0 |
| Needle Penetration @ 25° C. ASTM D 1321 | 0.1 mm | 0 | 1 | 2 | 5 | 8 |
| Needle Penetration @ 40° C. ASTM D 1321 | 0.1 mm | 1 | 4 | 5 | 12 | 23 |
| DSC Melt peak | ° C. | 82.3 | 79.9 | 78.5 | 80.8 | 82.5 |

As the gloss of Carnauba wax compositions on different materials is an important criteria for a lot of applications, the gloss of the inventive wax blends on paper and steel have been compared to pure Carnauba wax (see table 6).

TABLE 6

Gloss Units (GU) of different mixtures of Carnauba wax and blend 2.

| | | Carnau-bawax T3 | 25% Blend 2 | 50% Blend 2 | 75% Blend 2 | 100% Blend 2 |
|---|---|---|---|---|---|---|
| 60° Gloss (paper) | Before polishing | 5.8 | 38.1 | 23.4 | 30 | 21.6 |
| | After polishing | 40.1 | 58 | 43 | 47.6 | 38.6 |
| 60° Gloss (steel) | Before polishing | 2.8 | 6.2 | 9.6 | 7.4 | 6.5 |
| | After polishing | 50.7 | 44.6 | 43.3 | 64.4 | 55.5 |

For the gloss determination paper and steel have been coated with the respective wax blends in a film thickness of 120 μm (wet). Afterwards the gloss was measured according to ASTM D 523 before and after polishing at a specular angle of 60° using a BYK Gardener Micro-Tri-Gloss meter. The Gloss Unit (GU) of 100 is assigned to a highly polished, plane, black glass with a refractive index of 1.567 for the sodium D line. That means the nearer the value is to 100 GU the better is the glossiness. As it can be seen from the gloss values (table 6) wax blend 2 and mixtures thereof with Carnauba wax show better or at least similar gloss values compared to pure Carnauba wax, especially without polishing.

In a further step aqueous dispersions of Carnauba wax, oxidized Fischer-Tropsch wax and inventive blend 2 were produced (see table 7) with an ultrasonic sonotrode (Hielscher Sonotrode UP400st). The components were heated to 95° C. and properly mixed by stirring to form pre-emulsions. Then the stirred pre-emulsions were emulsified by using the Sonotrode without pulsing for 3 minutes adjusted at 200 W (resulting in 100-150 W) with an amplitude of 100%. Subsequently the emulsions were cooled in an ice bath to obtain the dispersions. The stability and particle size distribution of the resulting dispersions has been tested (table 7) and it was found that the dispersion of the inventive wax blend 2 shows comparable or even better results regarding these parameters compared to Carnauba wax.

TABLE 7

Formulation of aqueous dispersions and its properties.

| Component [wt.-%] | Description | Dispersion 1 (comp.) | Dispersion 2 (comp.) | Dispersion 3 (inv.) |
|---|---|---|---|---|
| Water | | 70 | 70 | 70 |
| Novelution 2205 | 2428+150EO | 5 | 5 | 5 |
| Carnaubawax T3 | | 25 | | |
| Sasolwax NCM 9381 | Ox. FT-Wax | | 25 | 12.5 |
| Sasolwax C80 | FT-Wax | | | 12.25 |
| Polyboost 165 | PO-Wax | | | 0.25 |
| Test | Unit | | | |
| Brookfield viscosity @ 25° C | mPa · s | 102 | 190 | 192 |
| Conductivity | μS/cm | 105 | 122 | 112 |
| Centrifuge test | % | 2 | 6 | 2 |
| dM | μm | 1.486 | 0.701 | 0.592 |
| d50 | μm | 1.22 | 0.545 | 0.489 |
| d90 | μm | 2.906 | 1.469 | 1.18 |
| specific surface | m²/ml | 8.363 | 16.46 | 17.8 |

The centrifuge test is a quick test for the stability of the dispersions. 10 ml of the wax dispersion were filled into a glass with a scale of 0.1 ml and centrifuged for one hour at 3100 min$^{-1}$ (2300 G). Afterwards the content of free water, which was formed on the bottom of the glass was determined and is indicated above in percent. The lower the value the higher is the stability of the dispersion.

The particle size was measured by laser diffraction with an instrument from Beckman Coulter (LS13320) using 5 drops of the dispersion diluted in 30 ml distilled water. The lower the particle size the better is the dispersibility of the wax composition.

Therefore, the inventive wax blend can not only be used as Carnauba wax replacement with regard to its physical data, but also with regards to its compatibility of use (e.g. dispersibility), which often was a problem with Carnauba wax replacements known from the prior art.

The invention claimed is:

1. A wax composition comprising at least a first wax composition and Carnauba wax, wherein the first wax composition comprises:
    linear and branched wax hydrocarbons having 15 to 110 carbon atoms; and
    oxidized hydrocarbons,
    characterized by
    a congealing point from 68° C. to 110° C.,
    an acid number of 3 to 30 mg KOH/g,
    a saponification number of 20 to 90 mg KOH/g; and
    a needle penetration at 25° C. of below 15¹/₁₀ mm; and
    wherein the first wax composition and the Carnauba wax are in a weight ratio of 1:9 to 9:1.

2. The wax composition according to claim 1, wherein the linear and branched wax hydrocarbons and wax hydrocarbons used to prepare the oxidized hydrocarbons are originating from synthetic hydrocarbons.

3. The wax composition according to claim 1, wherein the first wax composition further comprises a polyolefin wax.

4. The wax composition according to claim 3, wherein the first wax composition comprises 0.1 to 5 wt.-% polyolefin wax.

5. The wax composition according to claim 3, wherein the polyolefin wax is a polyalpha-olefin wax.

6. The wax composition according to claim 1, wherein the needle penetration at 25° C. of the first wax composition is equal to or below 10¹/₁₀ mm.

7. The wax composition according to claim 1, wherein the first wax composition is further characterized by one or more of the following features:
    a congealing point between 76° and 110° C.,
    an acid number of between 3 and 20 mg KOH/g or 6 and 20 mg KOH/g,
    a saponification number of between 25 and 80 mg KOH/g,
    a drop melting point of between 80 and 88° C.,
    a DSC melt peak at 82 to 84° C.,
    a color of below 1 measured according to ASTM D1500, and
    a clear and transparent liquid melt phase.

8. The wax composition according to claim 1, wherein the molar mass, provided as the number average, of the linear and branched wax hydrocarbons and/or the oxidized hydrocarbons is between 300 to 1500 g·mol$^{-1}$.

9. The wax composition according to claim 1, wherein the content of molecules of the linear and branched wax hydrocarbons and/or the oxidized hydrocarbons of the first wax composition in which the carbon chain is linear is above 75 wt.-%.

10. The wax composition according to claim 1, wherein the branched molecules of the wax hydrocarbons and/or the oxidized hydrocarbons contain more than 10 wt.-% with methyl branches and optionally the molecules comprise no quaternary carbon atoms, each of the first wax composition.

11. The wax composition according to claim 1, wherein the oxidized hydrocarbons are fully or partially saponified.

12. The wax composition according to claim 3, wherein more than 50 wt.-% of the first wax composition consists of polyolefin wax, wax hydrocarbons and oxidized hydrocarbons.

13. An aqueous dispersion comprising the wax composition according to claim 1 and water.

14. An aqueous dispersion according to claim 13, further comprising at least one surfactant.

15. An aqueous dispersion according to claim 13, wherein the aqueous dispersion has jointly or independent of each other
a solid content of above 20 wt.-%,
a Brookfield viscosity at 25° C. of below 500 mPa·s, and
an average particle size (number average) $d_{50}$ below 1 μm.

16. A method of producing an aqueous wax dispersion according to claim 14 comprising at least the following steps:
providing a wax composition in a molten state, said wax composition comprising at least a first wax composition and Carnauba wax, wherein the first wax composition comprises:
linear and branched wax hydrocarbons having 15 to 110 carbon atoms;
oxidized hydrocarbons, and
said first wax composition characterized by
a congealing point from 68° C. to 110° C.,
an acid number of 3 to 30 mg KOH/g,
a saponification number of 20 to 90 mg KOH/g; and
a needle penetration at 25° C. of below 15 1/10 mm;
and wherein the first wax composition and the Carnauba wax are in a weight ratio of 1:9 to 9:1
adding water and the surfactant in any order to the molten wax composition,
emulsifying the components together in a high pressure homogenizer, an autoclave or with a ultrasonic sonotrode.

17. The wax composition according to claim 1 in a polish, a personal care composition, a food coating, or a toner composition,
wherein the wax composition in each case is present in an amount of 1 to 50 wt. % of the respective polish, personal care composition, food coating, or toner composition.

18. The wax composition according to claim 17, wherein the polish is a shoe polish, a car polish, a plastic polish, or a metal polish; or
wherein the personal care composition is a lip care; or
wherein the toner composition is a chemical toner.

19. The wax composition according to claim 1, wherein the first wax composition and the Carnauba wax are in a weight ratio of 1:3 to 3:1.

20. A method of producing a wax composition according to claim 1 comprising at least the following steps:
providing as components at least a first wax composition and Carnauba wax, wherein the first wax composition comprises:
linear and branched wax hydrocarbons having 15 to 110 carbon atoms;
oxidized hydrocarbons, and said first wax composition characterized by
a congealing point from 68° C. to 110° C.,
an acid number of 3 to 30 mg KOH/g,
a saponification number of 20 to 90 mg KOH/g; and
a needle penetration at 25° C. of below 15 1/10 mm;
and wherein the first wax composition and the Carnauba wax are in a weight ratio of 1:9 to 9:1;
mixing the components in a molten state with each other to obtain the wax composition, and
solidifying the wax composition.

* * * * *